United States Patent [19]

Maraux

[11] Patent Number: 4,630,585
[45] Date of Patent: Dec. 23, 1986

[54] CARBURETING DEVICE FOR AN ENGINE

[76] Inventor: Jean Maraux, 43 Avenue Foch, 95170 Deuil la Barre, France

[21] Appl. No.: 709,734

[22] Filed: Mar. 8, 1985

[30] Foreign Application Priority Data

Mar. 9, 1984 [FR] France .................. 84 03652

[51] Int. Cl.$^4$ .......................................... F02B 33/00
[52] U.S. Cl. ................... 123/438; 123/492; 123/585
[58] Field of Search ............... 123/438, 585, 586, 492

[56] References Cited

U.S. PATENT DOCUMENTS

| | | | |
|---|---|---|---|
| 1,486,219 | 3/1924 | Adams | 123/585 |
| 1,503,555 | 8/1924 | Raule | 123/585 |
| 1,598,243 | 8/1926 | Chapin | 123/585 |
| 2,045,719 | 6/1936 | Munro | 123/585 |
| 3,294,074 | 12/1966 | Mennicken | 123/585 |
| 4,428,356 | 1/1984 | Kemmner | 123/585 |
| 4,494,517 | 1/1985 | Kratt | 123/585 |

Primary Examiner—Ronald B. Cox
Attorney, Agent, or Firm—Pollock, VandeSande & Priddy

[57] ABSTRACT

Carbureting device for supplying in air-fuel mixture to at least one heat engine combustion chamber and of the type comprising a passage of rich mixture and a passage of additional air wherein an element for controlling the constriction section of the passage of additional air is coupled to an actuating motor dependent upon the speed of rotation of the heat engine, this device being applied to a carburetor in order to suppress the enrichment pump and to obtain a lean air-fuel mixture for high rotation speeds of the engine.

3 Claims, 4 Drawing Figures

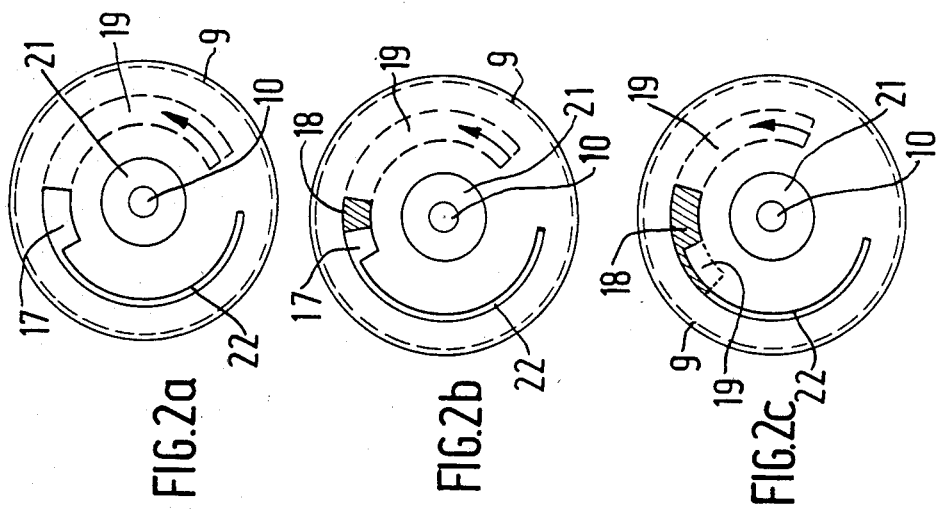
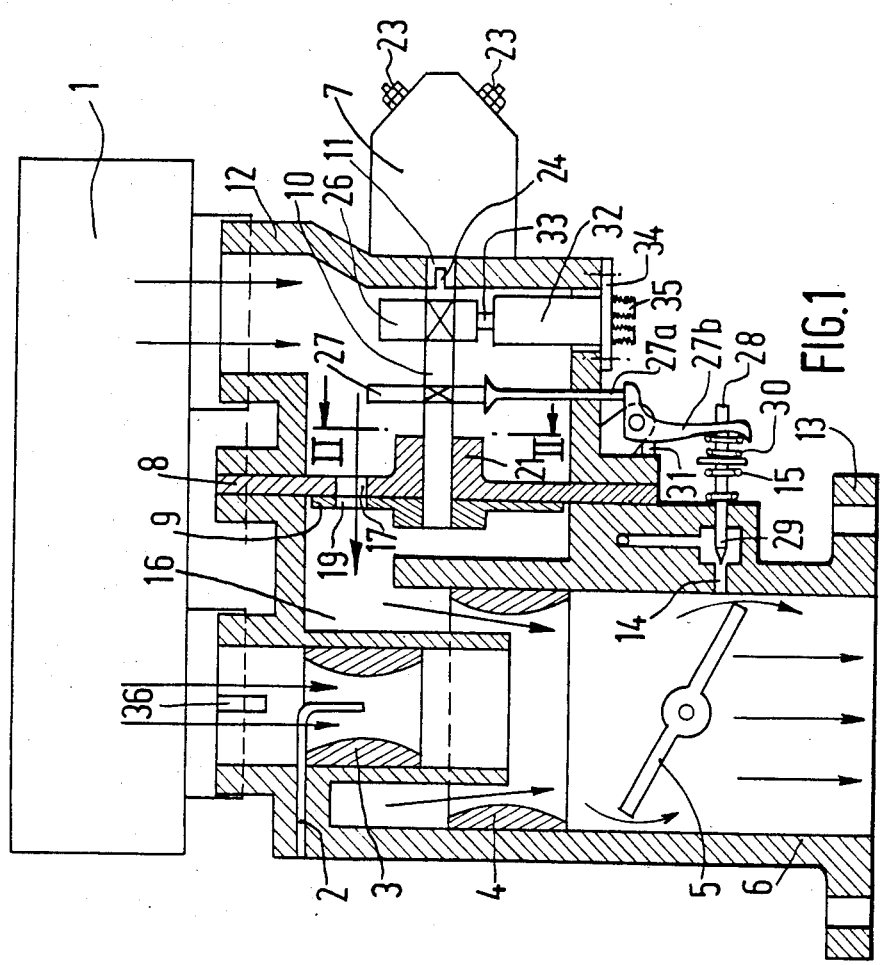

CARBURETING DEVICE FOR AN ENGINE

FIELD OF THE INVENTION

The present invention concerns a carbureting device, usually called a carburetor, for supplying an air-fuel mixture to at least one combustion chamber of an internal combustion engine, constituted by a first passage for the formation of a fuel-rich mixture and a second passage for additional air in which is disposed an adjustable constriction determining the final richness in fuel of the intake air into the said combustion chamber.

BACKGROUND OF THE INVENTION

The majority of carburetors used for supplying controlled ignition automobile engines with air-fuel mixtures comprise a gasoline pump, known as an "enrichment or acceleration pump". The purpose of this pump is to inject a quantity of vaporizable fuel, basically motor spirit, that is predetermined and increasing with the stroke of the accelerator pedal, so that the walls of the air intake pipes leading into the engine are moistened by the fuel and that after a sudden opening of the carburetor, the air-gasoline mixture retains a richness in gasoline close to that of the explosive or stoichiometric mixture. In fact, during complete opening of the carburetor, vaporization of the gasoline occurs not only in the carburetor, but also along the length of the intake pipes moistened by the gasoline in excess and situated downstream from the carburetor.

The action of the enrichment pump of the carburetor is carried out upon each depression of the accelerator pedal by a supplementary injection of gasoline that can reach several $cm^3$ per stroke according to the types of engines used. Apart from the acceleration phases at low R.P.M., this supplementary gasoline injection is not effective in suppressing a carburation gap. In order to suppress the gasoline consumption provoked by the actuation of the enrichment pump and the risk of cleaning out of the lubricating oil caused by this unburned gasoline injected at each acceleration, it has been proposed to suppress the enrichment pump, or to operate it only for low R.P.M. of the engine, but these dispositions although they are acceptable for drivers who do not require high performances from their engines, always become apparent by carburation deficiencies, in particular, during cold running of the engine and cannot be generalized.

The present invention proposes to suppress the effect of the carburetor enrichment pump at high R.P.M. of the engine while obtaining for the carbureted mixture a lean effect with increases which the engine R.P.M. but the increase of which is less and less rapid, so that the carburation of the mixture is always close to the optima (stoichiometric mixture) and reduces the consumption of the engine while improving its facility to change its R.P.M.

SUMMARY OF THE INVENTION

With this purpose, according to the invention, an adjustment member of the adjustable constriction is coupled to an actuating motor the position of which depends upon the speed of rotation of the engine through the intermediary of a servo-unit, so that for low rotation speeds (or R.P.M.) of the engine close to its idling speed, the constriction section is sealed off, then from a predetermined speed slightly higher than the idling speed, opens rapidly to a large passage, and after the engine exceeds a second predetermined speed called "enrichment cut-off", continues to open more slowly beyond the speed of rotation of the engine for which the use of an enrichment pump is no longer useful.

The servo-control of the adjustment member to the speed of rotation of the engine is preferably carried out with a slight delay during the increase in speed of the engine so as to accentuate the enrichment pump effect, i.e. fuel enrichment, provoked by the sealing off or the constricting of the second air passage.

According to another embodiment of the invention, the servo-unit is connected to manual correction means such as potentiometers, adapted to manually modify either the abutment of the actuating motor for low rotation speeds so as to manually control idling, or the servo-law or algorithm of the actuating motor compared to the speed of rotation of the engine so as to manually correct the carburation in function of the altitude or the fuel utilized.

Alternatively, the adjustment member for controlling the constriction section can cooperate with a sealing member for the fuel nozzle and/or the idling circuit of the engine so as to seal off the nozzle and/or the idling circuit once the engine has exceeded the second predetermined speed known as "enrichment cut-off".

According to the embodiment considered to be one of the best, the adjustment member for controlling the constriction section is constituted by an opening in the form of an arc of a circle, provided within a sealing flange of the second passage supporting a rotary shutter in which is provided, opposite the opening of the flange, a corresponding opening, one of these openings being formed by a portion of arc of great width constituting a passage hole and connected to another portion of arc of small width constituting a passage slot and the rotary shutter is fixedly connected with a control shaft connected to the rotor of the actuating motor so that for low rotation speeds of the engine, the rotary shutter completly seals off the opening of the flange, then when the first predetermined speed of rotation of the engine has been exceeded, the portion of the arc of great width provided on one of the openings is progressively placed opposite the other opening and that after exceeding the second predetermined speed of rotation of the engine, the portion of the arc of small width is progressively added to the portion of the arc of great width opposite the other opening and progressively increases the constriction section of the second air passage.

The rotary shutter can be mechanically connected to a cam outline adapted to cooperate with a cut-out member, such as a valve, of the fuel nozzle or the idling circuit of the engine, the said cam outline acting upon the said cut-off member as soon as the portion of arc of great width of the opening of the rotary shutter is placed completely opposite the opening of the sealing flange.

According to another embodiment, the actuating motor is a step-by-step electric motor coupled, through the intermediary of the servo-unit constituted by an electronic amplification circuit, to the ignition distributor of the engine utilized as a generator of the image of the speed of rotation of the engine and the angular position of the step-by-step motor is controlled using a recopy potentiometer that is preferably actuated through a mechanical link, interposed so as to be angularly adjustable between the electric step-by-step motor and the adjustment member of the constriction section.

BRIEF DESCRIPTION OF THE DRAWING

Other aims, advantages and objects of the invention will become apparent from reading through the following description of a preferred embodiment of the invention, given by way of non-limitative illustration and with reference to the appended drawing in which:

FIG. 1 is a schematic section of a carbureting device or carburetor according to the invention;

FIGS. 2a to 2c are plane views in detail referenced by lines II—II of FIG. 1, for various positions of the additional air shutter.

The carburetor represented in section in FIG. 1 is supplied with outside air through an air filter 1 and is intended to be connected to an engine intake pipe by a flange 13. This carburetor comprises a first air passage comprising in a manner known per se: a gasoline intake nozzle 2 connected to a gasoline float chamber at a constant level (not represented), a first venturi tube 3 of the air-gasoline mixture followed by a second venturi tube 4 connected to a second air passage 16 constituting a controllable supply of additional air. A throttle valve 5 placed downstream allows, by its rotation under control of the driver, to regulate the total air flow drawn by the engine through the carburetor and thereby the instantaneous output torque of the engine. In closed position, throttle 5 is applied on the internal walls of the passage of the molded body 6 of the carburetor, without however sealing off the intake of idling circuit 14 that constitutes a small carburetor operating when throttle 5 is sealed and the richness of which is adjustable by means of an idling richness screw (not represented).

According to the invention, second air passage 16 is shut by a sealing flange 8 formed of a plate tightened by screws on body 6 of the carburetor and which, as represented in detail in FIGS. 2a-c, presents an opening in the form of an arc of a circle constituted by a short portion of an arc of great width 17 and another portion of a longer arc of smaller width 22. The opening of the flange is adapted to be shut off by a rotary shutter 9 forming an additional air shutter and integral with a shaft 10 guided in a bearing 21 of sealing flange 8. Shaft 10 of the rotary shutter bears two cam outlines 26 and 27 and is connected by a flexible and/or adjustable coupling 24 to the shaft 11 of an actuating motor of the rotary shutter 9, constituted by a step-by-step electric motor 7 the electrical connectors 23 of which to an electronic servounit (not represented) are visible.

Engine 7 is flanged on the additional air housing 12, itself fixed on body 6 by tightening sealing flange 8 on this body. Rotary shutter 9 comprises an air passage opening formed by a portion of arc 19 the width of which is substantially equal to the width of short portion of arc 17 but extending on almost a semi-circle (cf. FIG. 2a). Shaft 10 integral with shutter 9 supports a cam outline 27 that is able to push by the intermediary of a rod 27a and a return lever 27b, rod 28 of a valve 29 sealing the idling air passage under the effect of a spring 30. If need be, the action of lever 27b can be cancelled by any adequate means, such as a wedge 31 in order to reestablish the idling circuit. The lower portion of the additional air housing 12 receives a recopy potentiometer 32, i.e. a potentiometer sensitive to movement of a mechanical member and the push rod 33 of said potentiometer is placed opposite cam 26 and its lower part bears an attachment flange 34 on housing 12 and connectors 35 to an electric control circuit.

The operation of the carburetor and the carbureting device according to the invention will now be described. The first air passage produces in the first venturi 3a mixture (generally in the form of an emulsion or foam) of air and gasoline relatively too rich in fuel. A choke shutter 36 is provided upstream of venturi 3 in order to allow realizing over-enrichment of the air-fuel mixture for starting the engine in cold conditions. The rich mixture issuing from the first venturi 3 is made lean at the level of the second venturi 4 through introduction of pure air, non-enriched in fuel, and the flow-rate of which is adjusted by the position of rotary shutter 9. The air-gasoline mixture that flows beyond throttle valve 5 towards the engine is perfectly homogenized, due to the double diffusion carried out in the carburetor and contains a proportion of fuel close to that of the stoichiometric mixture which, for gasoline corresponds to about fifteen air masses for one fuel mass, the ignition of the vaporized mixture being further ensured, for mixture ratios that do not differ greatly from the ideal ratio (for a rich or a poor mixture).

When the engine is at idle (between 600 and 1000 r.p.m. for standard automobile engines), throttle valve 5 is shut up and the engine is supplied by idling circuit 14 since movable shutter 9 is placed by its actuating motor 7 in a position where openings 17 and 22 are on and where cam outline 27 does not push rod 27a downwards in order to let valve 29 open. If the driver of the vehicle suddenly opens throttle valve 5, an air-gasoline mixture rich in fuel immediately flows towards the engine, which creates at the inlet of the cylinders of the engine after partial condensation on the intake walls, a quasi stoichiometric mixture that ignites easily and the carburation gap upon acceleration is suppressed as well as with the enrichment pump of carburetors of known type. When the speed of the engine is increased, actuating motor 7 is actuated step-by-step through the intermediary of the electronic circuit (not represented) sensitive to the speed of rotation of the engine (noted at the level of the ignition distributor) and movable shutter 9 turns to open an air passage represented by the hatched portion 18 in FIG. 2b. The flow-rate of additional air arriving at second venturi 4 reduces the richness of the air in fuel.

When the speed of the engine continues to increase, movable shutter 9 continues to turn and portion 22 of the opening of sealing flange 8 opens progressively in turn (cf. hatched area 18 on FIG. 2c) this time provoking a lean mixture for normal speeds of the engine. This correction reestablishes at high speed of the engine a normal richness for the air-gasoline mixture. In fact, in common carburetors, the kinematic viscosity of the air being higher than that of gasoline provokes an exaggerated excess in fuel for the high induction rates that becomes apparent by an excessive fuel consumption and polluting exhaust (enrichment fumes) that are suppressed by the carbureting device according to the invention. It will be noted that the hysteresis of the control of the step-by-step motor with respect to the increase of the engine speed creates the effect of an enrichment pump at all low speeds of the engine and up to a state corresponding to complete opening of the great width arc 17 for the second predetermined speed of rotation (that for which the enrichment pump effect is no longer useful).

In order to accurately indicate the position of shutter 9 and reset position of motor 7 with respect to its electronic control circuit, recopy potentiometer 32 is actuated by cam 26 rigidly fixed to shutter 9 and addresses to this electronic circuit a position signal that only depends on the position of shutter 9 independently of the coupling between this shutter 9 and the rotor of motor 7 via coupling 24. In the case of break-down of motor 7 or its electronic control circuit, a manual control can be provided in order to bring shutter 9 into wide open position of the second additional air passage, which corresponds to the suppression of the enrichment pump and does not prohibit use of the carburetor the throttle valve of which must thus be actuated progressively in order to prevent risks of "hiccups" in the carburation. In order to reestablish use of the idling circuit in case of break-down of motor 7, it is possible to block lever 27b by wedge 31 in order to maintain valve 29 open under the effect of a return spring 15, which maintains the idling circuit permanently open and not only for low speeds of rotation of the engine. In normal service, valve 29 cuts idling during the engine braking phases.

The electronic control circuit (not represented) of motor 7 is sensitive to the speed of rotation of the engine which it translates (proportionally or non proportionally) in rotation of actuating motor 7 of the rotary shutter 9. Numerous annexed parameters such as the temperature of intake air, the temperature of the engine, can have an influence on this electronic circuit like the electronic control of a gasoline injection circuit. It is also possible to foresee manual actions on this electronic circuit in order to allow to control manually, preferably by using potentiometers, operating characteristics of the engine such as: accelerated idling, servo-algorithm of additional air to the engine speed in order to manually correct the carburation in function of the altitude or fuel used.

Of course, the present invention is in no way limited to embodiments described and represented and it is adaptable to numerous variants available to the man skilled in the art without departing from the spirit and scope of the invention.

I claim:

1. A carburetor for supplying at least one chamber of an internal combustion engine with an air-fuel mixture, the carburetor comprising:
   a first conduit for carrying a fuel-rich mixture;
   a second conduit for delivering air to the fuel-rich mixture;
   adjustable constriction means located in the second conduit for setting the final fuel richness of the air-fuel mixture;
   servo means, responsive to engine speed, connected to an actuating motor;
   an adjustment member of the constriction means connected to the actuating motor for:
      sealing the constriction means near engine idling speeds;
      rapidly opening the constriction means at speeds slightly than idling;
      continuing to open the constriction means at a slower rate after engine speed exceeds a predetermined level corresponding to an enrichment cut-out condition;
   wherein the servo means slightly delays movement of the adjustment member during engine speed increases so as to obtain fuel enrichment during engine acceleration.

2. The structure set forth in claim 1 wherein said adjustment member comprises an internal sealing flange in the second conduit, the flange having a first arcuate opening;
   a rotary shutter having a second arcuate opening located adjacent the flange opening for varying the passage size through the shutter as it is rotated;
   one of the openings having a first section of larger predetermined radial width extending to a second section of smaller radial width;
   means connecting the shutter to the actuating motor;
   whereby the passage through the flange is:
      (a) sealed when the engine operates at predetermined low speeds;
      (b) opened, after a first predetermined engine speed is exceeded, by communication between the first and second arcuate openings characterized by one of the arcuate openings including only the first section of larger radial width;
      (c) opened further by adding to the passage the second section of smaller radial width;
      (d) cam means connected to the shutter for operating an idling fuel cut-out valve when the condition (b) occurs after a first predetermined engine speed is exceeded.

3. The structure set forth in claim 2 wherein the motor is a stepping motor; and
   further wherein the servo means comprises an amplifier connected at its input to an ignition distributor for the engine, the latter generating a signal proportional to engine speed; and
   further wherein the angular position of the motor is detected by a potentiometer responsive to the rotation of another cam connected to a rotor of the motor.

* * * * *